United States Patent [19]
Curet

[11] 4,082,608
[45] Apr. 4, 1978

[54] COOLING OF PRESSURIZED WATER NUCLEAR REACTOR VESSELS

[75] Inventor: Harvey Donald Curet, Idaho Falls, Id.

[73] Assignee: Energy, Inc., Idaho Falls, Id.

[21] Appl. No.: 732,254

[22] Filed: Oct. 14, 1976

[51] Int. Cl.² ............................................. G21C 15/00
[52] U.S. Cl. ...................................... 176/61; 176/50; 176/38
[58] Field of Search ........................ 176/50, 61, 37, 38

[56] References Cited

U.S. PATENT DOCUMENTS

| 3,366,546 | 1/1968 | Anthony et al. | 176/61 |
| 3,623,948 | 11/1971 | Dotson et al. | 176/61 |
| 3,864,209 | 2/1975 | Tong | 176/50 |
| 3,868,302 | 2/1975 | Singleton | 176/38 |

FOREIGN PATENT DOCUMENTS

| 1,253,830 | 11/1967 | Germany | 176/61 |

*Primary Examiner*—Harvey E. Behrend
*Attorney, Agent, or Firm*—Lynn G. Foster

[57] ABSTRACT

The improvement of pressurized water nuclear reactor vessels comprising flow dividers providing separate and distinct passages for the flow of core coolant water from each coolant water inlet, the flow dividers being vertically disposed in the annular flow areas provided by the walls of the vessel, the thermal shield (if present), and the core barrel. In the event of rupture of one of the coolant water inlet lines, water, especially emergency core coolant water, in the intact lines is thus prevented from by-passing the core by circumferential flow around the outermost surface of the core barrel and is instead directed so as to flow vertically downward through the annulus area between the vessel wall and the core barrel in a more normal manner to increase the probability of cooling of the core by the available cooling water in the lower plenum, thus preventing or delaying thermal damage to the core, and providing time for other appropriate remedial or damage preventing action by the operator.

3 Claims, 5 Drawing Figures

COOLING OF PRESSURIZED WATER NUCLEAR REACTOR VESSELS

BACKGROUND

1. Field of Invention

The present invention relates generally to pressurized water nuclear reactors and more particularly to an improvement in the cooling system of pressurized water reactor vessels.

2. Prior Art

Prior art pressurized water reactor vessels have utilized multiple cooling water inlets around the circumference of the reactor vessel, these inlets simultaneously delivering cooling water to annular flow passages common to all water inlets with no separation or direction of the flow from the individual water inlets. Thus, delivery of cooling water to the entrance of the reactor core symmetrically and efficiently has been dependent upon proper functioning of the individual water inlets and the connecting water delivery pipes. In the event of rupture of one of the water inlets or water inlet pipes, the flow patterns in such reactor vessels would be disrupted in that much of the primary fluid and emergency core coolant flow would occur circumferentially directly from the functioning water inlets to the ruptured water inlet, thus by-passing large amounts of water through the system without significant cooling effect upon the core. The reduction of cooling of the core could lead to rapid temperature increase beyond acceptable limits causing thermal damage to the core and other vessel components.

BRIEF SUMMARY AND OBJECTS OF THE PRESENT INVENTION

The present invention comprises an improvement in a pressurized water nuclear reactor vessel which prevents or subtantially alleviates the danger of overheating, with attendant thermal damage or destruction of the reactor core and vessel components in the event of rupture of one coolant inlet duct. With present vessel designs, such a loss of coolant accident reduces the amount of liquid coolant, especially emergency core coolant, supplied to flow through and cool the heat generating reactor core contained in the vessel and, more seriously, greatly reduces the cooling efficiency of the coolant which continues to enter the vessel through the remaining ducts. To prevent or delay the consequent rapid overheating and thermal deterioration of the core, the present invention assures that the coolant entering the vessel from the unruptured ducts will be directed to the lower plenum during such accident and will increase the probability of providing coolant to the core. The invention may be economically implemented without extensive modification to present pressurized water nuclear reactor vessel designs.

With the foregoing in mind, it is a primary object of the present invention to provide an improvement to typical pressurized water reactor vessels.

It is a further paramount objective of the invention to provide apparatus in pressurized water reactor vessels to assure maximum utilization of cooling water.

It is a further object of the invention to provide an improvement to the cooling system of a pressurized water reactor vessel to minimize or prevent thermal damage in the event of failure of the inlet cooling water system.

A further significant object of the invention is to provide an improvement to future pressurized water nuclear reactor vessels requiring minimum design changes at minimum cost.

It is a further object of the invention to provide an improvement in the cooling water system of pressurized water nuclear reactors without significant reduction in the area of flow passages within the reactor vessel.

It is another object of the invention to provide an improvement in the cooling water system of a pressurized water reactor vessel without altering its normal operating characteristics in any way.

These and other objects and features of the present invention will be apparent from the following detailed description, taken with reference to the accompanying drawings.

DETAILED DESCRIPTION OF THE ILLUSTRATED EMBODIMENT

Figure 1:
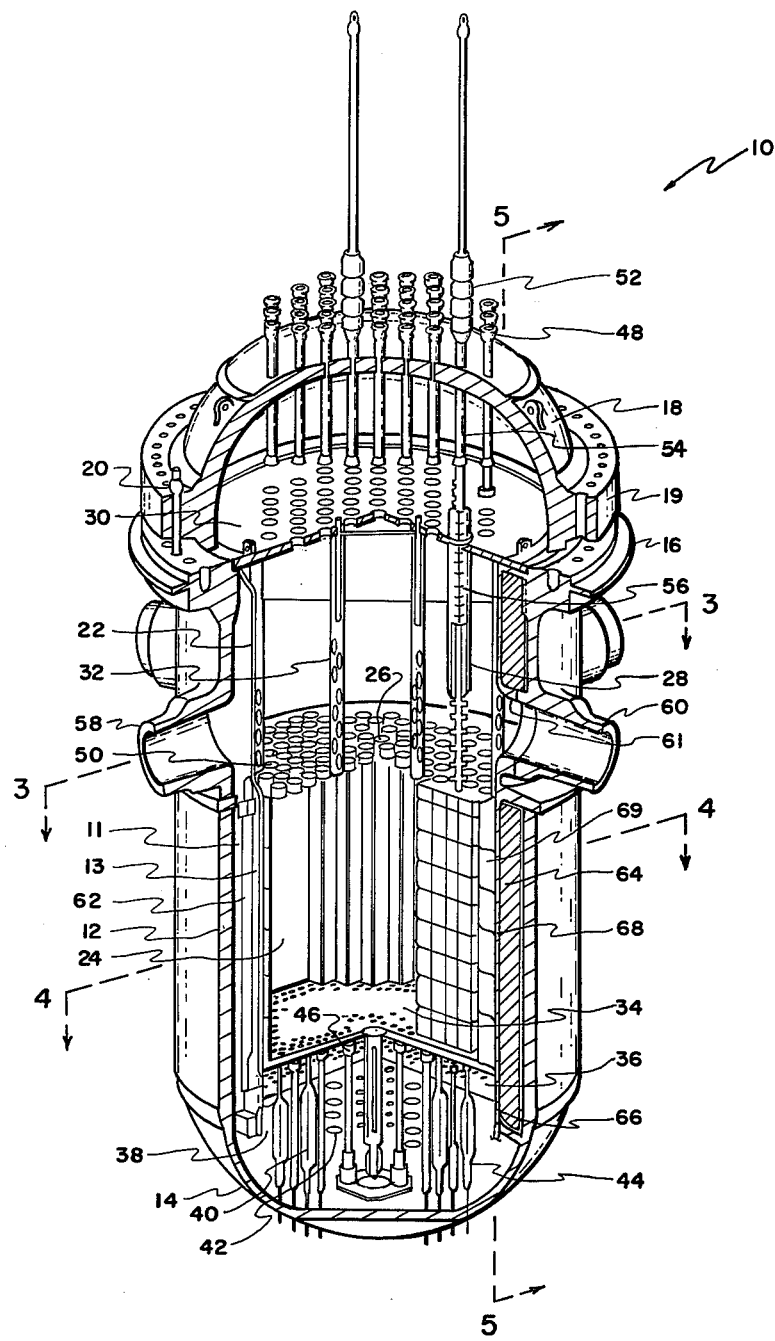
FIG. 1 is a partially sectioned perspective representation of a typical pressure water nuclear reactor vessel configuration having flow dividers according to the present invention.

Reference is now made to the drawings wherein like numerals are used to indicate like parts throughout. With reference to FIG. 1, the pressurized water nuclear reactor vessel is seen to comprise an outermost metallic cylindrical shell 12 closed at its lower extremity by an integral dome 14, and flanged to an upper closure 18. A generally cylindrical core barrel 22 is disposed centrally to the shell 12 and extends from the flanged upper terminus 16 of the shell 12 to the lower closure 14. A reactor core 24 is disposed in the core barrel 22. Great amounts of heat are generated in the core 12 during operation. With reference still to FIG. 1, the pressurized water reactor vessel embodiment generally designated 10 is seen to comprise also a plurality of water coolant inlet nozzles 58 integral with an outer shell 12 and disposed generally at equal circumferential intervals in a plane above an upper core plate 50, a plurality of water coolant outlet nozzles 60 integral with the outer shell carried also on the circumference of 12 and communicating with a plenum formed between the upper core plate 50 and the upper support plate 30 by means of the water outlet nipple 61 carried by a core barrel 22, a thermal shield 62 disposed generally centrally within the cylindrical annulus formed by the outer surface of the core barrel 22 and the inner surface of the outer shell 12, and a plurality of longitudinal flow dividers 64 extending generally from the outer surface of the core barrel 22 through the thermal shield to the vicinity of the inner surface of the outer shell 12. The thermal shield 62 shown in the illustrative embodiment 10 is often not a part of such reactor vessels. However, its presence or absence in any particular design does not substantially effect the functioning of the reactor in respect to the present invention. For purposes of consistency this description hereinafter continues to refer to the shield 62 as appropriate, it being understood that the present invention can be applied in all substantive aspects to designs without the shield 62. The flow dividers 64 serve to improve the cooling of the core 24 in the event that the flow of coolant water into the vessel 10 is allowed to leak from one of the nozzles 58 as the result of a loss of coolant accident, hereinafter fully described.

The cooling provisions for the core 24 are now briefly described with reference to the figures. Cooling of the core 24 is accomplished by a flow of both operational and emergency cooling water, which enters vessel 10 through coolant inlet nozzles 58, seen in FIG. 1 and again in FIG. 3 in cross sectional representation. After cooling the core, the cooling water leaves the vessel 10 via the coolant outlet nozzles 60 seen in FIGS. 1 and 3.

Figure 3:
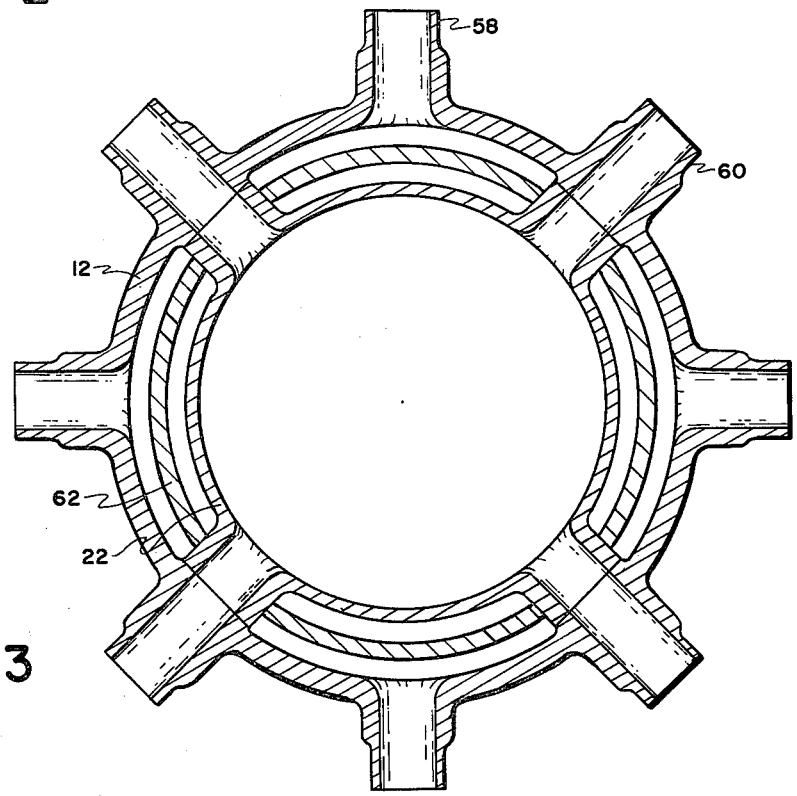
FIG. 3 is a cross sectional reprsentation taken along line 3—3 of FIG. 1 showing the coolng water inlet nozzles and the cooling water outlet nozzles.

Within the vessel 10, the entering cooling water flows downwardly through the annular flow passages 11 and 13, which annular passages are in present vessel designs not interrupted for their full circumference, not having the flow dividers 64. A passage 11 is formed by the inner wall of the shell 12 and the outer wall of the thermal shield 62, and the annular passage 13 is formed by the inner wall of the shield 62 and the outer wall of the core barrel 22. The passages 11 and 13 accept entering cooling water from the plurality of coolant inlet nozzles 58, as is best seen in FIG. 3. With present vessel designs, because of the symmetrical circumferential arrangement of the inlet nozzles 58, and because the nozzles 58 each receive substantially equal flows of cooling water, the passages 11 and 13 serve all of the nozzles 58 equally and the flow downward through the passages 11 and 13 is substantially uniformly downwardly directed throughout.

Therefore, the cooling water flows uniformly downwardly into the plenum area in the closure dome 14, and then upwardly uniformly generally through the core 24, to cool the core 24. As previously stated, the cooling water after passing through the core 24 exits the vessel through a plurality of uniformly circumferentially spaced exit nozzles 60, as seen in FIGS. 1 and 3. The aforesaid arrangement efficiently cools the core 24 during operation of the reactor.

Figure 4:
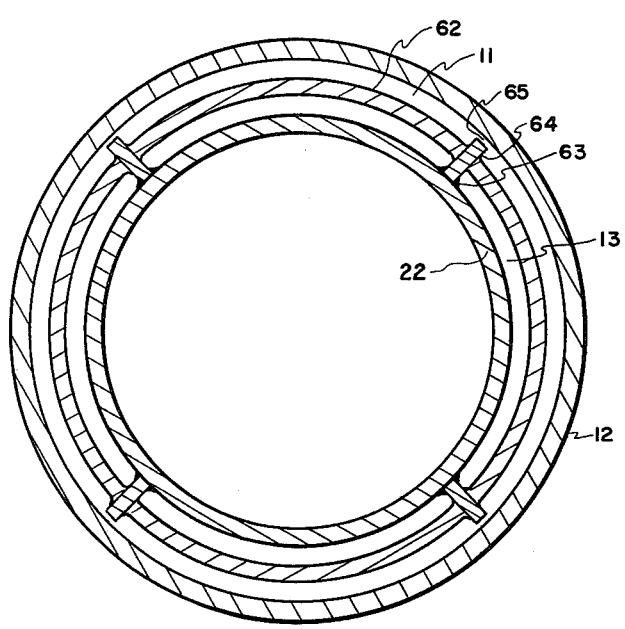
FIG. 4 is a partial section taken along line 4—4 of FIG. 1 showing the disposition of the flow dividers.
Figure 5:
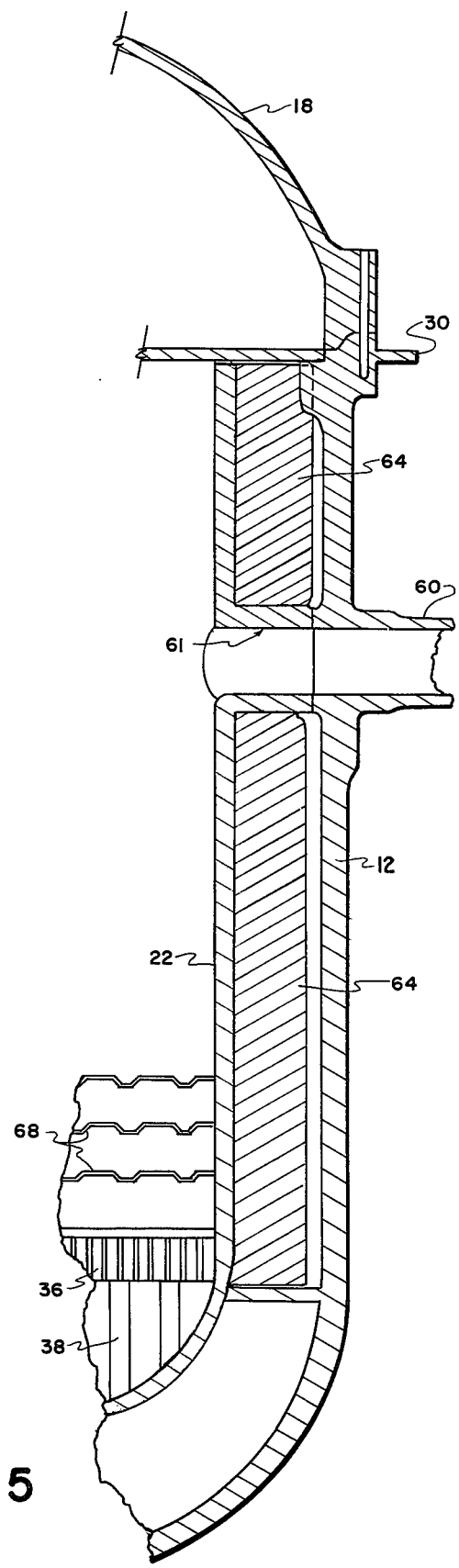
FIG. 5 is a partial vertical sectional view taken along line 5—5 of FIG. 1 showing a flow divider in detail.

The plurality of longitudinal dividers 64, as seen in FIGS. 1, 4, and 5 divide the above described flow passages 11 and 13 into a plurality of generally equal area arcuate passages, each of which is symmetrically disposed circumferentially with respect to an individual water inlet nozzle 58, the locations of which are indicated in FIG. 4. The divider 64, as seen in FIG. 5, extends substantially the full cylindrical length of the core barrel 22. It is apparent that entering cooling water through each individual nozzle 58 will be directed in total downwardly through an individual pair of passages 11 and 13.

Figure 2:
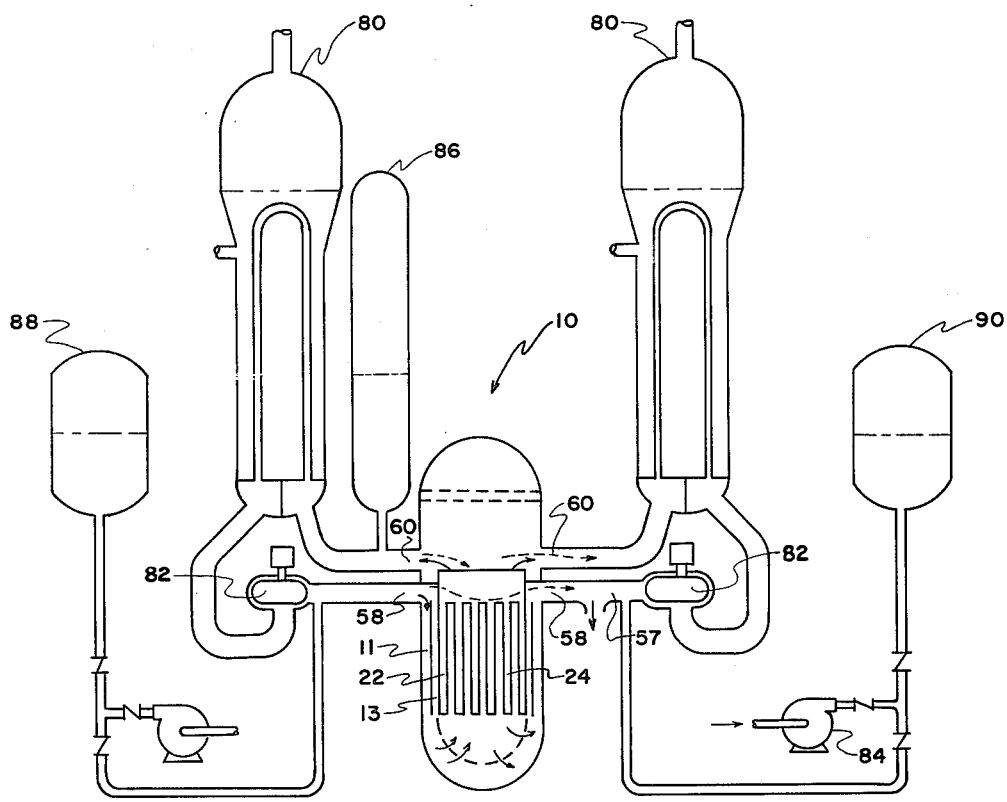
FIG. 2 is a schematic representation of a typical U.S. multiple loop pressurized water reactor system showing abnormal coolant flow patterns resulting from a break in a cooling water inlet.

Consider now the manner in which the above described present invention improves the operation of a typical pressurized water reactor system such as is illustrated schematically in FIG. 2. The major elements of a typical U.S. multiple loop pressurized water nuclear reactor system comprise the reactor vessel 10 used in conjunction with steam generators 80, primary water pumps 82, water supply pumps 84, accumulators 90, pressurizers 86, and gas domes 88. The cooling water is provided by the primary coolant pumps 82 and, after being heated in the core 24, is used to generate steam in the steam generators 80, which steam is used for power generation or the like.

The problem to which this invention is directed arises when one of the water inlet channels 57, feeding a corresponding inlet nozzle 58, ruptures, as schematically indicated in FIG. 2. Such an occurrence is the maximum credible accident involving failure of the reactor vessel to be properly cooled during operation.

In the event of such a rupture of the cooling water inlet passage, the flow patterns inside the reactor vessel are disrupted as shown by the dashed arrows in FIG. 2. Incoming water from the intact inlets 58, taking the most direct flow path offering least resistance, tends to proceed in significant part circumferentially through the annular passage generally toward the ruptured inlet, thereby passing through and out of the reactor vessel without passing through the core 24. Substantial portions of the cooling water, specifically emergency coolant water, entering the vessel 10 are therefore with present designs passed through the vessel without efficiently cooling the core 24. Accordingly, the flow dividers 64 of the present invention are specifically provided to prevent this by-pass flow of cooling water through the reactor vessel without passing through the lower plenum.

As hereinbefore described, the flow dividers 64 direct incoming coolant water from each flow inlet nozzle vertically downwardly through separate pairs of passages 11 and 13 to the lower plenum (if thermal shield is present). From the lower plenum the incoming water from each intact nozzle 58 may proceed upwardly through the core in a normal manner, since the individual passage to the ruptured flow inlet is of substantially restricted flow area in comparison to the total flow area through the reactor core. Therefore, in the event of an inlet line rupture being a loss of cooling accident, incoming water from the intact nozzles 58 will not initially by-pass the core without first flowing to the lower plenum, so that an inventory of coolant in the lower plenum will be available to cool the core. If sufficient cooling water is available, a portion of it may flow upwardly through the core 24 to provide direct cooling. If less is available significant cooling will occur from heat absorbed by water directed to the lower plenum as above described, which heat may also vaporize a portion of this water causing a flow of cooling steam upwardly through the core.

Returning now to FIG. 1, the various parts of the nuclear reactor vessel 10 are described in more detail. FIG. 1 shows an isometric partial sectional representation of a pressurized water reactor vessel configuration comprising a pressurized water reactor vessel generally designated 10. The pressurized water reactor comprises a generally cylindrical outer shell 12 being vertically disposed and having a lower integral closure 14 and a flanged upper terminus 16, a closure head assembly 18 having a lower flanged terminus 19 meeting with the upper terminus 16 of the outer shell, fastening means 20 securing the closure head assembly to the outer shell, a generally cylindrical core barrel 22 disposed centrally to the cylindrical outer shell 12 and extending from the flanged upper terminus to the lower closure 14, a reactor core 24 comprising a plurality of fuel rod assemblies 26 and an inner control rod cluster 28 shown withdrawn for illustrative purposes, an upper support plate 30, a plurality of support columns 32, a perforated lower control plate 34 generally supporting the core rod assemblies, a perforated flow mixer plate 36, a bottom support casting 38 being attached at its outer circumference to the lower extension of the core barrel 22 and having a plurality of passages 40 generally used for instrumentation assemblies and a plurality of passages 42 communicating generally with the perforations in the flow mixer plate 36, instrumentation thimble guides 44, access port 46, instrumentation ports 48 extending through the closure head 18 and through the upper support plate 30 thus providing data acquisition access to the plenum formed between the upper support plate 30 and the upper core plate 50, control rod drive mechanisms 52 and associated thermal control rod drive sleeves 54 and control rod guides tubes 56.

With reference to FIGS. 1, 3, 4, and 5, a typical four loop pressurized water reactor vessel configuration is seen to have four coolng water inlet nozzles 58 spaced 90° apart and four water outlet nozzles 60 spaced 90° apart disposed centrally between the water inlet nozzles. Other piping layouts are used for two or three loop and 2 × 4 loop systems. The flow dividers for any reactor system are spaced equally between the water inlet nozzles to provide for equal flow passages down the annular passages. Referring to FIG. 5, the flow dividers 64 may be integrally secured to the core barrel 22 and may extend radially through a longitudinal slot in the thermal shield 62 to a point near the inside surface of the outer shell. The thermal shield may or may not be present in the reactor vessel. Clearance 65 is provided between the outmost radial extension of the flow divider 64 and the inside surface of the outer shell 12 to allow for thermal expansion of the core barrel 22 during reactor operation. Referring now to FIG. 4, the flow divider is seen to extend vertically generally from the lower extension of the core barrel 22 to the upper extension of the core barrel 22, being divided into sections by the water outlet nipple 61. Attachment of the flow divider to the core barrel may be accomplished by welding 63 as indicated in FIG. 4 or by other suitable fastener means. The outer extremity of the flow dividers 64 are such that the core barrel 22 containing or engaging all of the internal components of the reactor vessel, may be removed from the vessel in the vertical direction consistent with the present typical pressurized water reactor vessel designs.

The invention preserves all major elements and components of typical pressurized water reactor vessel designs and can thus be used with very nominal design changes at minimal expense.

The invention may be embodied in other specific forms without departing from the spirit or essential characteristics thereof. The present embodiment is therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A pressurized water nuclear reactor vessel comprising:
   a generally cylindrical outer shell having closed ends, core coolant means being disposed adjacent one of said ends, said core coolant means being constructed and arranged to cause coolant to flow from adjacent second end into the reactor core,
   a generally cylindrical core barrel being of lesser diameter than the shell and being disposed centrally to the outer shell thereby forming an annular space between the barrel and the outer shell, said barrel carrying a plurality of core rod assemblies internal thereto.
   a plurality of coolant inlets carried by the shell and communicating coolant to an influent portion of the annular space, and
   a plurality of coolant outlets communicating coolant between the core coolant means of the core barrel and the exterior of the shell,
   structure to prevent core over heating during a loss of coolant accident comprising a plurality of generally parallel channels substantially arcuate in cross section, substantially equally sized and shaped and contiguous one with the next, said channels essentially filling said annular space, each channel extending longitudinally the full distance between said influent portion and the core coolant means at one end of the outer shell thereby substantially dividing the coolant into equal volumes of flow and directing each to the core barrel, the cross-sectional area of each channel being substantially constant throughout its length and means physically separating all structure in which coolant flows into the core barrel from all structure in which coolant flows from the core barrel.

2. The vessel of claim 1 futher comprising:
   a generally cylindrical thermal shield disposed in the annular space dividing the channels into two generally concentric sets of coolant flow channels, 3. The vessel of claim 1 wherein each channel comprises:
   two partition means disposed upon and attached to the outer surface of the core barrel and extending longitudinally said entire distance thereby defining the channel width.

* * * * *